US006229683B1

(12) United States Patent
Goodwin-Johansson

(10) Patent No.: US 6,229,683 B1
(45) Date of Patent: May 8, 2001

(54) HIGH VOLTAGE MICROMACHINED ELECTROSTATIC SWITCH

(75) Inventor: Scott Halden Goodwin-Johansson, Pittsboro, NC (US)

(73) Assignee: MCNC, Research Triangle Park, NC (US)

( * ) Notice: Subject to any disclaimer, the term of this patent is extended or adjusted under 35 U.S.C. 154(b) by 0 days.

(21) Appl. No.: 09/345,722

(22) Filed: Jun. 30, 1999

(51) Int. Cl.$^{7}$ .................... H02N 13/00

(52) U.S. Cl. .................... 361/233; 361/207

(58) Field of Search .................... 361/230–235, 361/207; 200/181

(56) References Cited

U.S. PATENT DOCUMENTS

| | | |
|---|---|---|
| Re. 33,568 | 4/1991 | Harnden, Jr. et al. . |
| Re. 33,577 | 4/1991 | Harnden, Jr. et al. . |
| Re. 33,587 | 5/1991 | Harnden, Jr. et al. . |
| Re. 33,618 | 6/1991 | Harnden, Jr. et al. . |
| Re. 33,691 | 9/1991 | Harnden, Jr. et al. . |
| 2,851,618 | 9/1958 | Krawinkel . |
| 2,927,255 | 3/1960 | Diesel . |
| 2,942,077 | 6/1960 | Diesel . |
| 3,772,537 | 11/1973 | Clifford et al. . |
| 3,897,997 | 8/1975 | Kalt . |
| 3,917,196 | 11/1975 | Pond et al. . |
| 3,989,357 | 11/1976 | Kalt . |
| 4,025,193 | 5/1977 | Pond et al. . |
| 4,094,590 | 6/1978 | Kalt . |
| 4,105,294 | 8/1978 | Peck . |
| 4,160,582 | 7/1979 | Yasuo . |

(List continued on next page.)

FOREIGN PATENT DOCUMENTS

| | | |
|---|---|---|
| 44 37 261 | 10/1995 | (DE) . |
| 601771 | 3/1978 | (SU) . |
| 94/09819 | 9/1994 | (WO) . |

OTHER PUBLICATIONS

*Surface–Micromachined Electrostatic Microrelay*, I. Schiele et al., Sensors and Actuators A 66 (1998) pp. 345–354, No month.

(List continued on next page.)

*Primary Examiner*—Michael J. Sherry
(74) *Attorney, Agent, or Firm*—Alston & Bird LLP

(57) ABSTRACT

A MEMS (Micro Electro Mechanical System) electrostatically operated high voltage switch or relay device is provided. This device can switch high voltages while using relatively low electrostatic operating voltages. The MEMS device comprises a microelectronic substrate, a substrate electrode, and one or more substrate contacts. The MEMS device also includes a moveable composite overlying the substrate, one or more composite contacts, and at least one insulator. In cross section, the moveable composite comprises an electrode layer and a biasing layer. In length, the moveable composite comprises a fixed portion attached to the underlying substrate, a medial portion, and a distal portion moveable with respect to the substrate electrode. The distal and/or medial portions of the moveable composite are biased in position when no electrostatic force is applied. Applying a voltage between the substrate electrode and moveable composite electrode creates an electrostatic force that attracts the moveable composite to the underlying microelectronic substrate. The substrate contact and composite contact are selectively interconnected in response to the application of electrostatic force. Once electrostatic force is removed, the moveable composite reassumes the biased position such that the substrate and composite contacts are disconnected. Various embodiments further define components of the device. Other embodiments further include a source of electrical energy, a diode, and a switching device connected to different components of the MEMS device. A method of using the aforementioned electrostatic MEMS device is provided.

42 Claims, 5 Drawing Sheets

U.S. PATENT DOCUMENTS

| | | |
|---|---|---|
| 4,473,859 | 9/1984 | Stone et al. . |
| 4,160,583 | 7/1979 | Ueda . |
| 4,208,103 | 6/1980 | Kalt et al. . |
| 4,209,689 | 6/1980 | Linford et al. . |
| 4,229,075 | 10/1980 | Ueda et al. . |
| 4,235,522 | 11/1980 | Simpson et al. . |
| 4,248,501 | 2/1981 | Simpson . |
| 4,266,339 | 5/1981 | Kalt . |
| 4,336,536 | 6/1982 | Kalt et al. . |
| 4,361,911 | 11/1982 | Buser et al. . |
| 4,403,166 | 9/1983 | Tanaka et al. . |
| 4,447,723 | 5/1984 | Neumann . |
| 4,468,663 | 8/1984 | Kalt . |
| 4,480,162 | 10/1984 | Greenwood . |
| 4,488,784 | 12/1984 | Kalt et al. . |
| 4,517,569 | 5/1985 | Gerharz . |
| 4,553,061 | 11/1985 | Germano . |
| 4,564,836 | 1/1986 | Vuilleumier et al. . |
| 4,581,624 | 4/1986 | O'Connor . |
| 4,595,855 | 6/1986 | Farrall . |
| 4,620,123 | 10/1986 | Farrall et al. . |
| 4,620,124 | 10/1986 | Farrall et al. . |
| 4,622,484 | 11/1986 | Okihara et al. . |
| 4,626,698 | 12/1986 | Harnden, Jr. et al. . |
| 4,658,154 | 4/1987 | Harnden, Jr. et al. . |
| 4,695,837 | 9/1987 | Kalt . |
| 4,727,593 | 2/1988 | Goldstein . |
| 4,731,879 | 3/1988 | Sepp et al. . |
| 4,736,202 | 4/1988 | Simpson et al. . |
| 4,737,660 | 4/1988 | Allen et al. . |
| 4,747,670 | 5/1988 | Devio et al. . |
| 4,777,660 | 10/1988 | Gould et al. . |
| 4,786,898 | 11/1988 | Hata et al. . |
| 4,794,370 | 12/1988 | Simpson et al. . |
| 4,807,967 | 2/1989 | Veenvliet et al. . |
| 4,811,246 | 3/1989 | Fitzgerald, Jr. et al. . |
| 4,819,126 | 4/1989 | Kornrumpf et al. . |
| 4,826,131 | 5/1989 | Mikkor . |
| 4,831,371 | 5/1989 | Hata . |
| 4,857,757 | 8/1989 | Sato et al. . |
| 4,891,635 | 1/1990 | Hata . |
| 4,893,048 | 1/1990 | Farrall . |
| 4,916,349 | 4/1990 | Kornrumpf . |
| 4,983,021 | 1/1991 | Fergason . |
| 5,051,643 | 9/1991 | Dworsky et al. . |
| 5,065,978 | 11/1991 | Albarda et al. . |
| 5,093,600 | 3/1992 | Kohl . |
| 5,162,691 | 11/1992 | Mariani et al. . |
| 5,231,559 | 7/1993 | Kalt et al. . |
| 5,233,459 | 8/1993 | Bozler et al. . |
| 5,243,861 | 9/1993 | Kloeck et al. . |
| 5,258,591 | 11/1993 | Buck . |
| 5,261,747 | 11/1993 | Deacutis et al. . |
| 5,268,696 | 12/1993 | Buck et al. . |
| 5,274,379 | 12/1993 | Carbonneau et al. . |
| 5,278,368 | 1/1994 | Kasano et al. . |
| 5,311,360 | 5/1994 | Bloom . |
| 5,355,241 | 10/1994 | Kelly . |
| 5,367,136 | 11/1994 | Buck . |
| 5,367,584 | 11/1994 | Ghezzo et al. . |
| 5,438,449 | 8/1995 | Chabot et al. . |
| 5,463,233 | 10/1995 | Norling . |
| 5,467,068 | 11/1995 | Field et al. . |
| 5,479,042 | 12/1995 | James et al. . |
| 5,499,541 | 3/1996 | Hopf et al. . |
| 5,519,565 | 5/1996 | Kalt et al. . |
| 5,544,001 | 8/1996 | Ichiya et al. . |
| 5,552,925 | 9/1996 | Worley . |
| 5,578,976 | 11/1996 | Yao . |
| 5,594,292 | 1/1997 | Takeuchi et al. . |
| 5,619,061 | 4/1997 | Goldsmith et al. . |
| 5,619,177 | 4/1997 | Johnson et al. . |
| 5,620,933 | 4/1997 | James et al. . |
| 5,627,396 | 5/1997 | James et al. . |
| 5,629,565 | 5/1997 | Schlaak et al. . |
| 5,638,084 | 6/1997 | Kalt . |
| 5,638,946 | 6/1997 | Zavracky . |
| 5,658,698 | 8/1997 | Yagi et al. . |
| 5,659,195 | 8/1997 | Kaiser et al. . |
| 5,661,592 | 8/1997 | Bornstein et al. . |
| 5,666,258 | 9/1997 | Gevatter et al. . |
| 5,673,785 | 10/1997 | Schlaak et al. . |
| 5,677,823 | 10/1997 | Smith . |
| 5,681,103 | 10/1997 | Remillard et al. . |
| 5,723,894 | 3/1998 | Ueno et al. . |
| 5,726,480 | 3/1998 | Pister . |
| 5,796,152 | 8/1998 | Carr et al. . |
| 5,818,683 | 10/1998 | Fujii . |
| 5,880,921 * | 3/1999 | Tham et al. ........................ 361/233 |

OTHER PUBLICATIONS

*Active Joints for Microrobot Limbs*, M. Elwenspoek et al., J. Micromech. Microeng. 2 (1992) pp. 221–223, No month.

*Deformable Grating Light Valves for High Resolution Displays*, R. B. Apte et al., Solid–State Sensor and Actuator Workshop, Jun. 13–16, 1994, pp. 1–6.

*Microwave Reflection Properties of a Rotating Corrugated Metallic Plate Used as a Reflection Modulator* G. E. Peckman et al., IEEE Transactions on Antennas and Propagation, vol. 36, No. 7, Jul., 1988, pp. 1000–1006.

*Large Aperture Stark Modulated Retroreflector at 10.8 μm*, M. B. Klein, J. Appl. Phys. 51(12), Dec. 1980, pp. 6101–6104.

*A Large–Aperture Electro–Optic Diffraction Modulator*, R. P. Bocker et al., J. Appl. Phys. 50(11), Nov. 1979, pp. 6691–6693.

*Integrable Active Microvalve With Surface Micromachined Curled–Up Actuator*, J. Haji–Babaer et al., Transducers 1997 International Conference on Solid–State Sensors and Actuators, Chicago, Jun. 16–19, 1997, pp. 833–836.

*Electrostatic Curved Electrode Actuators*, R. Legtenberg et al., IEEE Catalog No. 95CH35754, Jan. 29, Feb.2, 1995, pp. 37–42.

Design and Development of Microswitches for Micro–Electro–Mechanical Relay Matrices, Thesis, M. W. Pillips, USAF, AFIT/GE/ENG/95J–02, 1995, No month.

* cited by examiner

HIGH VOLTAGE MICROMACHINED ELECTROSTATIC SWITCH

FIELD OF THE INVENTION

The present invention relates to microelectromechanical switch and relay structures, and more particularly to electrostatically activated high voltage switch and relay structures.

BACKGROUND OF THE INVENTION

Advances in thin film technology have enabled the development of sophisticated integrated circuits. This advanced semiconductor technology has also been leveraged to create MEMS (Micro Electro Mechanical System) structures. MEMS structures are typically capable of motion or applying force. Many different varieties of MEMS devices have been created, including microsensors, microgears, micromotors, and other microengineered devices. MEMS devices are being developed for a wide variety of applications because they provide the advantages of low cost, high reliability and extremely small size.

Design freedom afforded to engineers of MEMS devices has led to the development of various techniques and structures for providing the force necessary to cause the desired motion within microstructures. For example, microcantilevers have been used to apply rotational mechanical force to rotate micromachined springs and gears. Electromagnetic fields have been used to drive micromotors. Piezoelectric forces have also been successfully been used to controllably move micromachined structures. Controlled thermal expansion of actuators or other MEMS components has been used to create forces for driving microdevices. One such device is found in U.S. Pat. No. 5,475,318, which leverages thermal expansion to move a microdevice. A micro cantilever is constructed from materials having different thermal coefficients of expansion. When heated, the bimorph layers arch differently, causing the micro cantilever to move accordingly. A similar mechanism is used to activate a micromachined thermal switch as described in U.S. Pat. No. 5,463,233.

Electrostatic forces have also been used to move structures. Traditional electrostatic devices were constructed from laminated films cut from plastic or mylar materials. A flexible electrode was attached to the film, and another electrode was affixed to a base structure. Electrically energizing the respective electrodes created an electrostatic force attracting the electrodes to each other or repelling them from each other. A representative example of these devices is found in U.S. Pat. No. 4,266,399. These devices work well for typical motive applications, but these devices cannot be constructed in dimensions suitable for miniaturized integrated circuits, biomedical applications, or MEMS structures.

Micromachined MEMS electrostatic devices have been created which use electrostatic forces to operate electrical switches and relays. Various MEMS relays and switches have been developed which use relatively rigid cantilever members separated from the underlying substrate in order to make and break electrical connections. Typically, contacts at the free end of the cantilever within these MEMS devices move as the cantilever deflects, so that electrical connections may be selectively established. As such, when the contacts are connected in these MEMS devices, most of the cantilever remains separated from the underlying substrate. For instance, U.S. Pat. Nos. 5,367,136, 5,258,591, and 5,268,696 to Buck, et al., U.S. Pat. No. 5,544,001 to Ichiya, et al., and U.S. Pat. No. 5,278,368 to Kasano, et al. are representative of this class of microengineered switch and relay devices.

Another class of micromachined MEMS switch and relay devices include curved cantilever-like members for establishing electrical connections. For instance, U.S. Pat. Nos. 5,629,565 and 5,673,785 to Schlaak, et al., describe a microcantilever that curls as it separates from the fixed end of the cantilever and then generally straightens. The electrical contact is disposed at the generally straight free end of the microcantilever. When electrostatically attracted to a substrate electrode, the Schlaak devices conform substantially to the substrate surface except where the respective electrical contacts interconnect. In addition, a technical publication by Ignaz Schiele et al., titled *Surface-Micromachined Electrostatic Microrelay*, also describes micromachined electrostatic relays having a curled cantilever member. The Schiele cantilever initially extends parallel to the underlying substrate as it separates from the fixed end before curling away from the substrate. While the cantilever member having a contact comprises a multilayer composite, flexible polymer films are not used therein. As such, the Schiele devices do not describe having the cantilever member conform substantially to the underlying substrate in response to electrostatic actuation thereof.

MEMS electrostatic switches and relays are used advantageously in various applications because of their extremely small size. Electrostatic forces due to the electric field between electrical charges can generate relatively large forces given the small electrode separations inherent in MEMS devices. However, problems may arise when these miniaturized devices are used in high voltage applications. Because MEMS devices include structures separated by micron scale dimensions, high voltages can create electrical arcing and other related problems. In effect, the close proximity of contacts within MEMS relays and switches multiplies the severity of these high voltage problems. Further, relatively high electrostatic voltages are required to switch high voltages. The air gap separation between the substrate electrode and moveable cantilever electrode affects the electrostatic voltage required to move the cantilever electrode and operate the switch or relay. A relatively large air gap is beneficial for minimizing high voltage problems. However, the larger the air gap, the higher the voltage required to operate the electrostatic switch or relay. As such, traditional MEMS electrostatic switch and relay devices are not well suited for high voltage switching applications.

It would be advantageous to switch high voltages using MEMS devices operable with relatively low electrostatic voltages. In addition, it would be advantageous to provide MEMS electrostatic switching devices that overcome at least some of the arcing and high voltage operational problems. There is still a need to develop improved MEMS devices for switching high voltages while leveraging electrostatic forces. Existing applications for MEMS electrostatic devices could be better served. In addition, advantageous new devices and applications could be created by leveraging the electrostatic forces in new MEMS structures.

SUMMARY OF THE INVENTION

It is an object of the present invention to provide MEMS electrostatic switches and relays that can switch high voltages while using relatively lower electrostatic voltages.

In addition, it is an object of the present invention to provide MEMS electrostatic switches and relays actuators that overcome at least some of the arcing and other problems related to high voltage.

Further, it is an object of the present invention to provide improved MEMS electrostatic switches and relays.

The present invention provides improved MEMS electrostatic devices that can operate as high voltage switches or relays. Further, a method for using a MEMS electrostatic device according to the present invention is provided. The present invention solves at least some of the problems noted above, while satisfying at least some of the listed objectives.

A MEMS device driven by electrostatic forces according to the present invention comprises a microelectronic substrate, a substrate electrode, a substrate contact, a moveable composite, a composite contact, and an insulator. A microelectronic substrate defines a planar surface upon which the MEMS device is constructed. The substrate electrode forms a layer on the surface of the microelectronic substrate. The moveable composite overlies the substrate electrode. In cross section, the moveable composite comprises an electrode layer and a biasing layer. The moveable composite across its length comprises a fixed portion attached to the underlying substrate, and a distal portion moveable with respect to the substrate electrode. The composite contact is attached to the composite. In addition, an insulator electrically isolates and separates the substrate electrode from the electrode layer of the moveable composite. Applying a voltage between the substrate electrode and moveable composite electrode creates an electrostatic force that attracts the moveable distal portion of the composite to the underlying microelectronic substrate. As such, the substrate contact and composite contact are electrically connected together in response to the application of electrostatic force.

One embodiment of the MEMS electrostatic device according to the present invention forms the electrode layer and biasing layer of the moveable composite from one or more generally flexible materials. Layers comprising the composite can be selected such that the moveable composite substantially conforms to the surface of the microelectronic substrate when the distal portion of the moveable composite is attracted to the microelectronic substrate. In addition, layers comprising the composite can be selected such that the distal portion can be positionally biased with respect to the microelectronic substrate when no electrostatic force is applied. Other embodiments define the relative positions of the substrate contact and the substrate surface, as well as the characteristics of the surface of the substrate contact. One embodiment provides a plurality of substrate contacts, which optionally may be interconnected in series or in parallel. The position of the insulator relative to the substrate electrode, substrate contact, and substrate is further defined in one embodiment. One embodiment describes the characteristics of the electrode layer and biasing layers comprising the moveable composite.

In a further embodiment, the characteristics of the distal portion of the moveable composite are described. One embodiment describes the attributes of, and positions of, the composite contact relative to the moveable composite. Further, in one embodiment, the composite contact comprises a plurality of contacts, which optionally may be connected in series or in parallel. An embodiment also details the shapes and relative sizes of the substrate electrode and composite electrode. Other embodiments further comprise a source of electrical energy and electrically connected to at least one of the substrate contact and the composite contact, or electrically connected to at least one of the substrate electrode and the composite electrode. Optionally, these embodiments may further include a diode or a switching device.

In addition, another embodiment of the present invention provides a method of using the electrostatic MEMS devices described above. The method comprises the step of electrically isolating at least one of the substrate contact or the composite contact from its respective associated substrate electrode or composite electrode. The method comprises the step of selectively generating an electrostatic force between the substrate electrode and the electrode layer of the moveable composite, and moving the moveable composite toward the substrate. Lastly, the method comprises the step of electrically isolating the substrate contact and composite contact in a circuit electrically isolated from at least one of the substrate electrode or composite electrode.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will filly convey the scope of the invention to those skilled in the art. Like numbers refer to like elements throughout.

Figure 2:
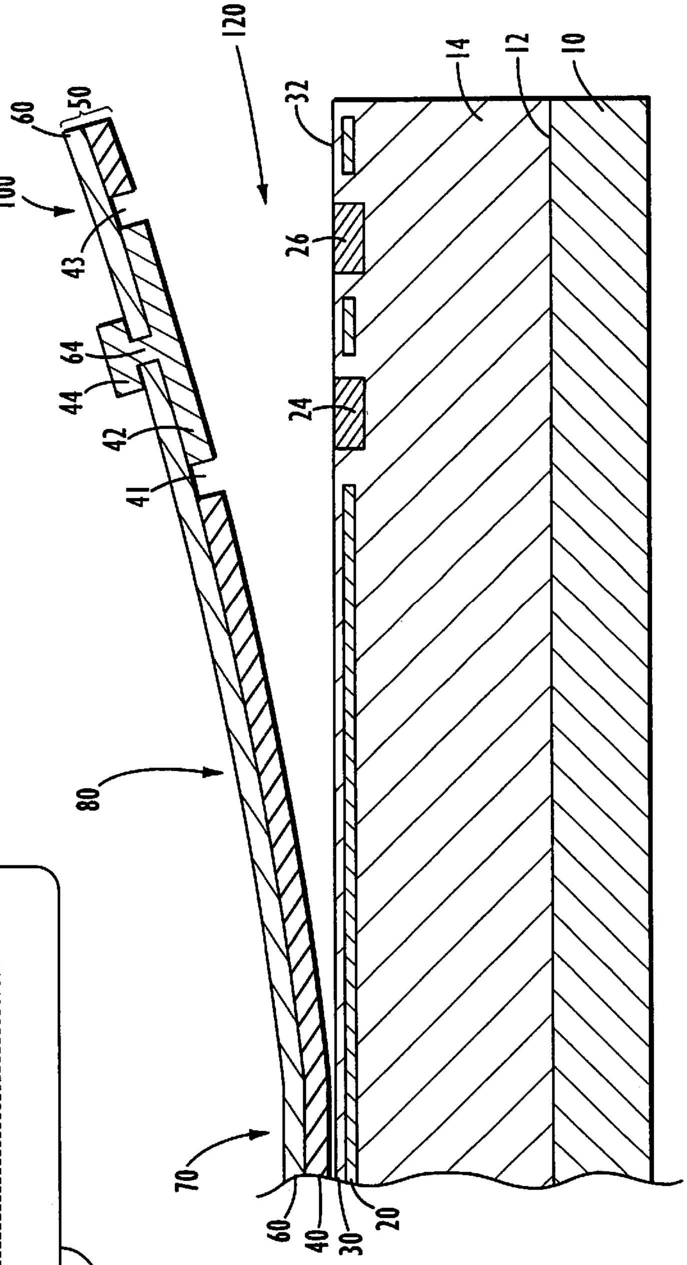
FIG. 2 is a cross-sectional view of an embodiment of the present invention, taken along the line 2—2 of FIG. 1.
Figure 1:
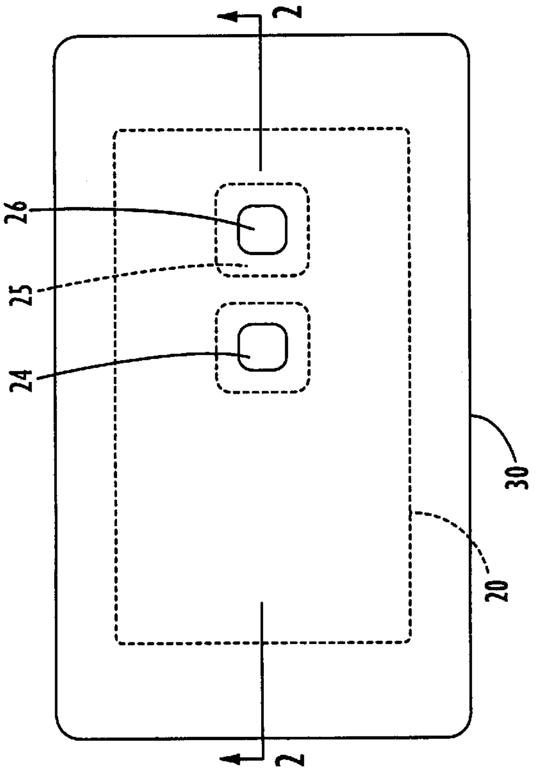
FIG. 1 is a top plan view of an embodiment of the present invention.

Referring to FIGS. 1 and 2, the present invention provides a MEMS device driven by electrostatic forces that can switch high voltages while using relatively lower electrostatic operating voltages. In a first embodiment, an electrostatic MEMS device comprises in layers, a microelectronic substrate 10, a substrate electrode 20, a substrate insulator 30, and a moveable composite 50. The moveable composite is generally planar and overlies the microelectronic substrate and substrate electrode. The layers are arranged and shown vertically, while the portions are disposed horizontally along the moveable composite. In cross section, the moveable composite 50 comprises multiple layers including at least one electrode layer 40 and at least one biasing layer 60. Along its length, the moveable composite has a fixed portion 70, a medial portion 80, and a distal portion 100. The fixed portion is substantially affixed to the underlying microelectronic substrate or intermediate layers. The medial portion and distal portion are released from the underlying substrate, and in operation preferably both portions are moveable with respect to the underlying substrate and substrate electrode. The medial portion extends from the fixed portion and is biased or held in position without the application of electrostatic force. The distal portion extends from the medial portion, and is also biased or held in position without the application of electrostatic force. However, in some embodiments, the medial portion may be held in position whether or not electrostatic force is applied, such that only the distal portion is free to move in operation. An air gap 120 is defined between the medial portion, distal portion, and the planar surface of the underlying microelectronic substrate. By predefining the shape of the air gap, recently developed MEMS electrostatic devices can operate with lower and less erratic operating voltages. For example, U.S. patent application Ser. No. 09/320,891, assigned to MCNC, the assignee of the present invention, describing these improved electrostatic devices, is incorporated by reference herein.

The electrostatic MEMS device, including the moveable composite and underlying substrate layers, is constructed using known integrated circuit materials and microengineering techniques. Those skilled in the art will understand that different materials, various numbers of layers, and numerous arrangements of layers may also be used to form the underlying substrate layers. Although the MEMS device illustrated in the Figures will be used as an example to describe manufacturing details, this discussion applies equally to all MEMS devices provided by the present invention unless otherwise noted. Referring to FIGS. 1 and 2, a microelectronic substrate 10 defines a planar surface 12 upon which the electrostatic MEMS device is constructed. Preferably the microelectronic substrate comprises a silicon wafer, although any suitable substrate material having a planar surface can be used. Other semiconductors, glass, plastics, or other suitable materials may serve as the substrate. An insulating layer 14 overlies the planar surface of the microelectronic substrate and provides electrical isolation. The insulating layer preferably comprises a non-oxidation based insulator or polymer, such as polyimide or nitride. In this case, oxide based insulators cannot be used if certain acids are used in processing to remove the release layer. Other insulators, even oxide based insulators, may be used if release layer materials and compatible acids or etchants are used for removing the release layer. For instance, silicon dioxide could be used for the insulating layers if etchants not containing hydrofluoric acid are used. The insulating layer is preferably formed by depositing a suitable material on the planar surface of the microelectronic substrate. A substrate electrode 20 is disposed as a generally planar layer affixed to at least a portion of the surface of the underlying insulating layer 14. The substrate electrode preferably comprises a gold layer deposited on the top surface of the insulating layer. If the substrate electrode is formed from a layer of gold, optionally a thin layer of chromium may be deposited onto the substrate electrode layer to allow better adhesion to the insulating layer and any adjacent materials. Alternatively, other metallic or conductive materials may be used so long as they are not eroded by release layer processing operations.

Preferably, a second insulating layer 30 is deposited on the substrate electrode 20 to electrically isolate the substrate electrode and prevent electrical shorting. Further, the second insulating layer provides a dielectric layer of predetermined thickness between the substrate electrode 20 and the moveable composite, including the moveable electrode 40. The second insulating layer 30 preferably comprises polyimide, although other dielectric insulators or polymers tolerant of release layer processing may also be used. The second insulating layer 30 has a generally planar surface 32.

Figure 6:
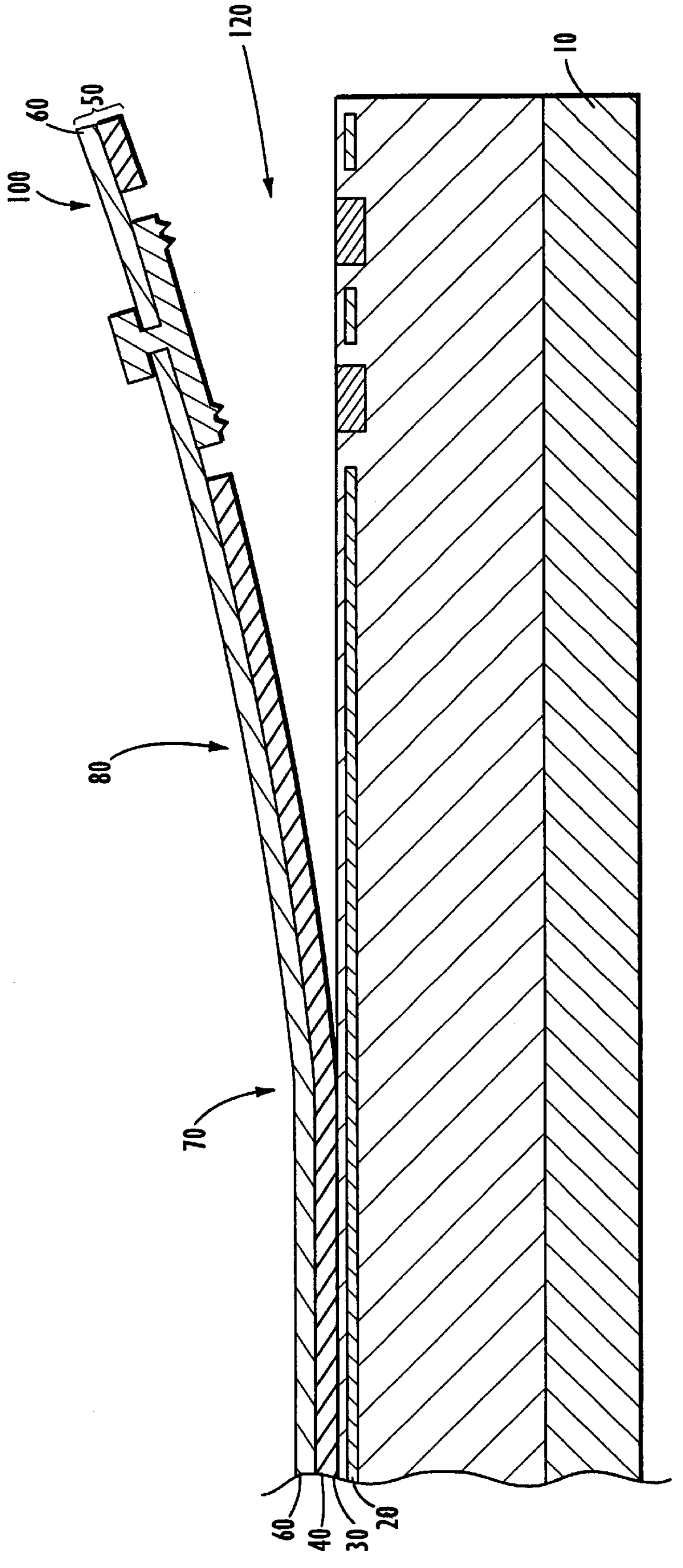
FIG. 6 is a cross-sectional view of an alternate embodiment of the invention.
Figure 7:
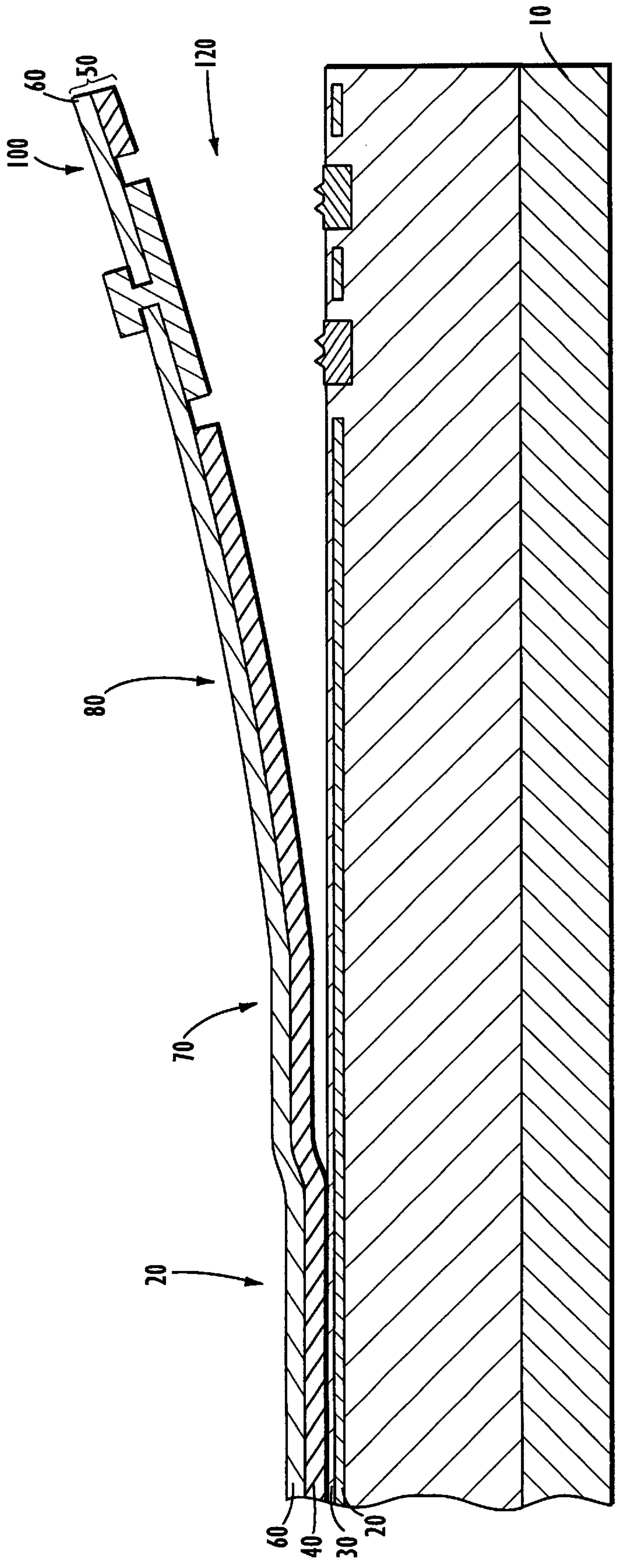
FIG. 7 is a cross-sectional view of an alternate embodiment of the invention.

A release layer, not shown, is first deposited on the planar surface 32 in the area underneath the medial and distal portions of the overlying moveable composite, occupying the space shown as the air gap 120. The release layer is only applied to areas below moveable composite portions not being affixed to the underlying planar surface. Preferably, the release layer comprises an oxide or other suitable material that may be etched away when acid is applied thereto. After the overlying layers have been deposited, the release layer may be removed through standard microengineering acidic etching techniques, such as a hydrofluoric acid etch. When the release layer has been removed, the medial and distal portions of moveable composite 50 are separated from the underlying planar surface 32, creating the air gap 120 therebetween. The shape of the air gap is determined according to the bias provided to the distal portion and/or medial portion of the moveable composite when no electrostatic force is applied. In one embodiment, the air gap decreases and gradually ends where the fixed portion of the moveable composite contacts the underlying substrate, as shown in FIG. 6. In another embodiment, shown in FIG. 7, the air gap decreases, has a generally constant width, and then ends abruptly where the fixed portion contacts the underlying substrate. The medial portion in this Figure has a generally cantilevered part overlying the substrate proximate the fixed portion.

The layers of the moveable composite 50 generally overlie planar surface 32. Known integrated circuit manufacturing processes are used to construct the layers comprising moveable composite 50. At a minimum, two layers comprise the moveable composite 50, one layer of moveable electrode 40 and one layer of polymer film 60 disposed on either side of the moveable electrode. The layer of polymer film preferably comprises the biasing layer used to hold the moveable composite in a given position with respect to the underlying planar surface, absent electrostatic forces. Preferably, at least one of the layers comprising the moveable composite is formed from a flexible material, for instance flexible polymers and/or flexible conductors may be used. Optionally, a first layer of polymer film can be applied overlying at least part of the area defined by the release layer and the exposed planar surface 32, so as to insulate the moveable electrode 40 layer from the underlying substrate. For instance, a layer of polymer film, such as polymer film 60 shown as the top layer of the moveable composite 50, can be used as the first layer of polymer film. While polyimide is preferred for the polymer film layer, many other flexible polymers suitable for release layer fabrication processes may be used.

Moveable electrode 40, preferably comprising a layer of flexible conductor material, is deposited overlying the planar surface 32. The moveable electrode may be deposited directly upon the planar surface or over an optional first layer of polymer film, as needed. The moveable electrode 40 preferably comprises gold, although other conductors tolerant of release layer processing and flexible, such as conductive polymer film, may be used. The surface area and/or configuration of moveable electrode 40 can be varied as required to create the desired electrostatic forces to operate the high voltage MEMS device. Optionally, a second layer of polymer film 60 is applied overlying at least part of the moveable electrode layer. As before, a flexible polymer such as polyimide is preferred for the second polymer film layer. If gold is used to form the moveable electrode, a thin layer of chromium may be deposited onto the moveable electrode layer to allow better adhesion of the gold layer to the adjacent materials, such as to one or more layers of polymer film.

The number of layers, thickness of layers, arrangement of layers, and choice of materials used in the moveable composite may be selected to bias the moveable composite as required. In particular, the distal portion and/or the medial portion can be biased as they extend from the fixed portion. The biased position of the medial and distal portions can be customized individually or collectively to provide a desired separation from the underlying planar surface and the substrate electrode. The distal and medial portions can be biased to remain parallel to the underlying planar surface. Alternatively, the distal and medial portions can be biased to alter the separation from the underlying planar surface by curling toward or curling away from the underlying planar surface. Preferably, the distal portion and optionally the medial portion are biased to curl away from the underlying substrate and alter the separation therefrom. Those skilled in the art will appreciate that more than one polymer film layer may be used, and that the films may be disposed on either side or both sides of the moveable electrode.

At least one of the layers comprising the moveable composite can function as a composite biasing layer used to bias or urge the moveable composite to curl as required. Preferably, the medial portion 80 and distal portion 100 are biased to curl away from the underlying surface 32, after the release layer has been removed. Providing differential thermal coefficients of expansion between the layers comprising the moveable composite can create bias. Assuming an increase in temperature, the moveable composite will curl toward the layer having the lower thermal coefficient of expansion because the layers accordingly expand at different rates. As such, the moveable composite having two layers with different thermal coefficients of expansion will curl toward the layer having a lower thermal coefficient of expansion as the temperature rises. In addition, two polymer film layers having different thermal coefficients of expansion can be used in tandem with an electrode layer to bias the moveable composite as necessary.

Of course, other techniques may be used to curl the flexible composite. For example, different deposition process steps can be used to create intrinsic stresses so as to curl the layers comprising the flexible composite. Further, the flexible composite can be curled by creating intrinsic mechanical stresses in the layers included therein. In addition, sequential temperature changes can be used to curl the flexible composite. For instance, the polymer film can be deposited as a liquid and then cured by elevated temperatures so that it forms a solid polymer layer. Preferably, a polymer having a higher thermal coefficient of expansion than the electrode layer can be used. Next, the polymer layer and electrode layer are cooled, creating stresses due to differences in the thermal coefficients of expansion. The flexible composite curls because the polymer layer shrinks faster than the electrode layer.

Further, the relative thickness of the layers comprising the moveable composite and the order in which the layers are arranged can be selected to create bias. In addition, two or more polymer films of different thickness can be used on either side of the electrode layer for biasing purposes. For example, the thickness of the moveable electrode layer can also be selected to provide bias. As such, the medial portion and distal portion can be positionally biased and urged to curl with respect to the microelectronic substrate and substrate electrode. In one embodiment, the distal portion of the moveable composite curls out of the plane defined by the upper surface of the moveable composite when no electrostatic force is created between the substrate electrode and the composite electrode layer. Further, the medial portion, the distal portion, or both, can be biased to curl with any selected radius of curvature along the span of the portion, such as a variable or constant radius of curvature.

The MEMS device is adapted to function as an electrostatically operated high voltage switch or relay. One or more substrate contacts, for example substrate contacts 24 and 26 shown in FIGS. 1 and 2, are attached to the substrate. Each substrate contact is preferably formed from a metallization layer, such as gold. Alternatively, if gold contacts are used a thin layer of chromium may be deposited onto the gold contacts to allow better adhesion of the gold layer to the adjacent materials. However, other metallic or conductive materials can be used so long as they are not eroded by processing used to remove the release layer. Preferably, each substrate contact is electrically isolated and insulated from the substrate electrode 20 and any other substrate contacts, such that arcing and other high voltage problems are minimized. For instance, insulating gap 25 is provided to surround and insulate substrate contact 26 accordingly. In this embodiment, the insulating gap preferably contains the insulating layer 14, although air or other insulators can be used therein. In addition, the substrate electrode preferably surrounds at least part of the insulating gap around each substrate contact, such that the moveable composite can be electrostatically attracted over and firmly contact the entire surface area of the substrate contact.

Figure 3:
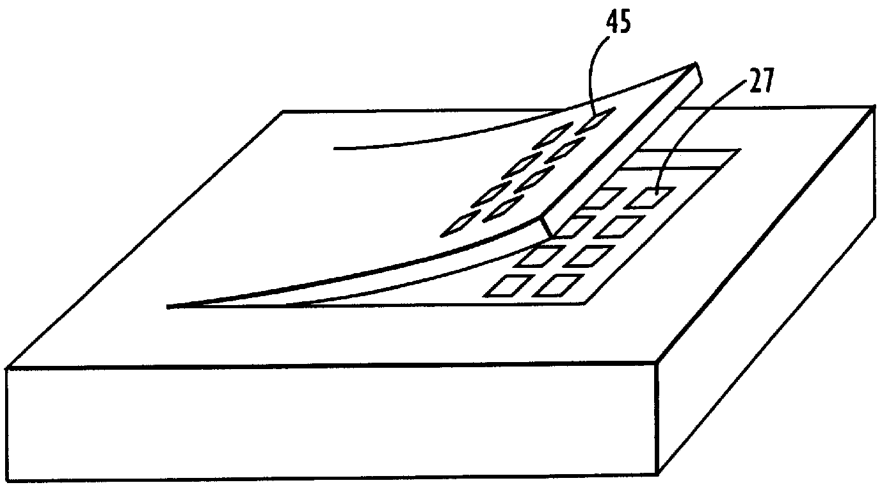
FIG. 3 is a perspective view of an alternate embodiment of the present invention having a plurality of electrical contacts.
Figure 4:
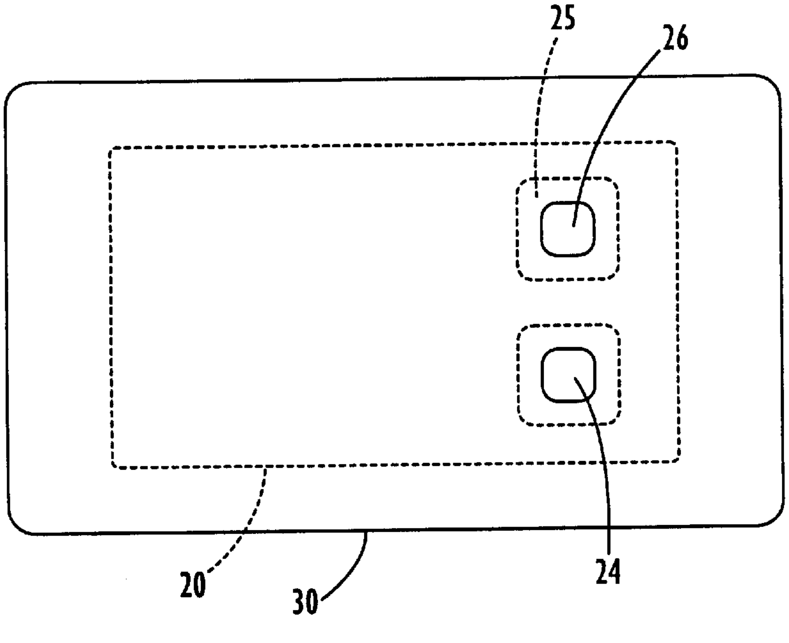
FIG. 4 is a top plan view of an alternate embodiment of the present invention.

The characteristics of the substrate contact or contacts can be customized as required for a given switch or relay application. The substrate contact can be generally flush with, or can protrude up from, the upper planar surface 32 of the substrate. As necessary, the substrate contact can have at least one generally smooth surface and/or at least one generally rough surface. For example, the substrate contacts are relatively smooth in FIG. 6, while the substrate contacts have a generally rough, raised surface in FIG. 7. For some applications, having one of the mating contacts generally smooth and the other generally rough can provide a better electrical connection with lower contact resistance, since the protrusion of the rough surface tends to better contact the smooth surface. A single substrate contact may be provided in some switches or relays for selectively connecting complimentary contacts disposed on the moveable composite, for instance to serve as a shorting bar. Alternatively, a plurality of substrate contacts may be provided. See FIG. 3 for an example of multiple substrate contacts, such as contact 27 for instance. In some cases, it may be advantageous to electrically connect at least two of the plurality of substrate contacts in series. It may be advantageous to connect at least two of the plurality of substrate contacts in parallel. In other cases, some of the plurality of substrate contacts may be connected in series and some may be connected in parallel, as required. In one embodiment, the moveable composite forms a trough as it curls, and at least two of the plurality of substrate contacts are disposed perpendicular to the trough, as shown in FIG. 1, or parallel to the trough, as shown in FIG. 4.

One embodiment of the present invention further provides one or more contacts within the moveable composite 50, such as composite contact 42 in FIG. 2. Each composite contact is preferably disposed within the moveable electrode 40 layer and attached to the moveable composite. Preferably, one or more composite contacts are formed from the moveable composite electrode layer, as shown. Insulating gaps, such as 41 and 43, serve to electrically isolate the composite contacts from the moveable electrode. While the insulating gaps are preferably filled with air, many other suitable insulators can be used. Like the moveable electrode layer, one or more insulators can be used to insulate and electrically isolate the composite contact(s) from the substrate electrode. For instance, an insulating layer 30, a layer of polymer film 60, or both can be selectively applied as needed to electrically isolate the moveable composite and one or more composite contacts from the underlying substrate electrode 20. Preferably, there is no insulation disposed between one or more composite contacts, such as 42, and one or more substrate contacts, such as 24 and 26. Accordingly, the MEMS device can function as a switch or relay once the substrate and composite contacts are selectively connected. Optionally, the composite contact can be adapted to extend through one or more apertures, such as 64, formed in polymer film layer 60. In this case, at least a portion of the composite contact 42 protrudes above the upper polymer film layer so as to provide one or more electrical connections, such as 44. Metal lines may be deposited to connect to the composite contact through the provided electrical connection(s).

In addition, the attributes of the composite contact can be customized as required for a given switch or relay application. The composite contact can be generally flush with, or can protrude down from, the lower surface of the moveable composite. As necessary, the composite contact can have at least one generally smooth surface and/or at least one generally rough surface. For example, the composite contacts are relatively rough in FIG. 6, while the composite contacts have a generally smooth surface in FIG. 7. As discussed, some applications are better served by having one of the mating contacts generally smooth and the other generally rough, such that a better electrical connection with lower contact resistance is provided. And, single or multiple composite contacts may be provided in some switches or relays according to the present invention. See FIG. 3 for an example of multiple composite contacts, such as contacts 45 for instance. Further, at least one of the plurality of composite contacts can be electrically isolated from the composite electrode in one embodiment. In addition, in one embodiment the composite electrode surrounds at least part of the insulating gap around each composite contact, such that the moveable composite can be electrostatically attracted over, and firmly contact the entire surface area of the substrate contact.

The relative placement of substrate and composite contact sets within the plurality can be varied for different switch or relay applications. As shown in FIG. 1, two or more mating contacts sets can be disposed along the span of the moveable composite, such that some contact sets are mated before others. For example, substrate contact 24 will mate with the composite contact before substrate contact 26 as the moveable composite is attracted to the underlying substrate. However, two or more contact sets can be disposed along the width of the moveable composite, such that two or more contact sets are mated at generally the same time. As shown in FIG. 4, for instance, substrate contact 24 and substrate contact 26 will mate with the composite contact generally in parallel. Further, as FIG. 3 shows, contact sets within the plurality can be disposed to mate both in series and in parallel as the moveable composite is attracted thereto.

Further, the characteristics of the substrate electrode and composite electrode may be customized as needed for given switch or relay applications. The surface area and shape of the substrate electrode 20 can be varied as required to create the desired electrostatic forces. While the substrate electrode can have varying degrees of overlap with the moveable composite 50, in one embodiment, the substrate electrode underlies substantially the entire area of the distal portion 100 of the moveable composite. The overlap between the substrate electrode and composite electrode can be used to customize the characteristics of the electrostatic device. In one embodiment, the surface area of the substrate electrode comprises generally the same area as the moveable composite electrode. A further embodiment provides a substrate electrode having generally the same shape as the moveable composite electrode. One embodiment provides a moveable composite and the constituent layers having a generally rectangular shape.

Some embodiments of the MEMS device according to the present invention further comprise a source of electrical energy and an optional switching device. See FIG. 5. The source of electrical energy can be any voltage source, current source, or electrical storage device, such as a battery, charged capacitor, energized inductor, or the like. The switching device can be any electrical switch or other semiconductor device used for selectively making and breaking an electrical connection. In one embodiment, a source of electrical energy 130 is connected to the substrate electrode, composite electrode, or both, of the MEMS device. Optionally, a switching device 133 may also be connected to the source of electrical energy, the substrate electrode, the composite electrode, or combinations thereof in the MEMS device. In another embodiment, a source of electrical energy 135 can be connected to the substrate contact, composite contact, or both, of the MEMS device. In addition, the source of electrical energy 135 and one or more electrical devices, for example D1 and D2 shown as 137 and 138 respectively, are electrically connected through at least one substrate contact, at least one composite contact, or through both types of contacts. As such, the source of electrical energy and devices D1 and D2 can be selectively connected when the substrate contact(s) and composite contact(s) are electrically connected in response to the application of electrostatic forces when energy from source 130 is applied to the substrate and composite electrodes, attracting them towards each other. Preferably, an electrical load is connected to the substrate contacts, and the composite contact is used as a shorting bar for interconnecting the electrical load. Those skilled in the art will understand that sources of electrical energy, switching devices, diodes, and electrical loads can be interconnected in various ways without departing from the present invention.

Figure 5:
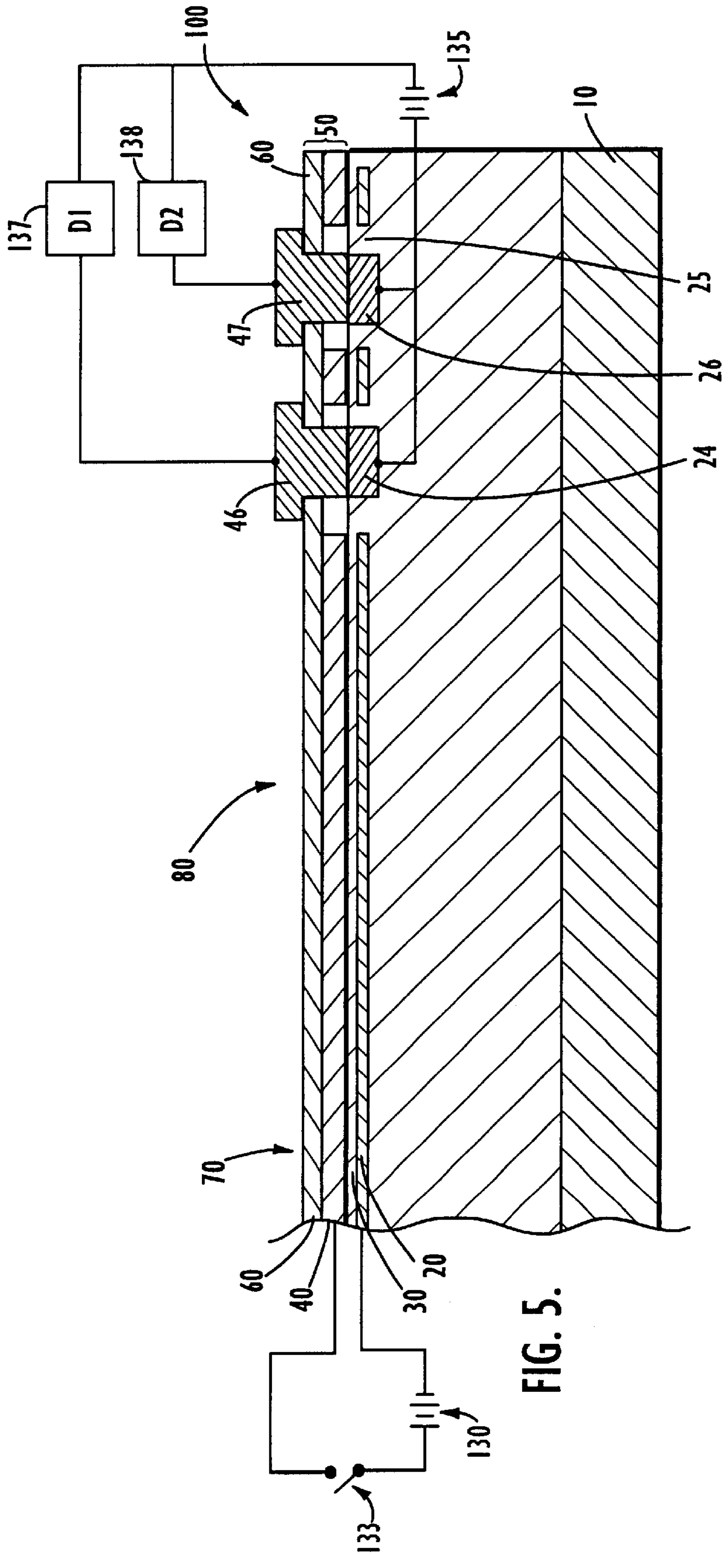
FIG. 5 is a cross-sectional view of an alternate embodiment of the present invention.

In operation, when no electrostatic force is applied to the substrate and composite electrodes the distal portion and optionally the medial portion of the moveable composite are biased in the separated position. Preferably, the portion(s) are biased to curl naturally away and increase the separation from the underlying planar surface. As described, the portion (s) of the moveable composite can also be biased in a position parallel to the underlying planar surface of the substrate. In addition, the portion(s) can be biased to alter the separation from the underlying planar surface while extending from the fixed portion. The application of electrical charge to the substrate electrode and moveable composite electrode creates an electrostatic attraction between them, causing the movable biased portion(s) to uncurl and conform to the surface of the underlying planar surface. Once the moveable composite is attracted to the underlying surface, the composite contact(s) and substrate contact(s) are accordingly electrically connected to complete a circuit, as shown in FIG. 5. Alternatively, the electrostatic force can repel the substrate and moveable electrodes, causing the moveable distal portion to curl away from the planar surface of the microelectronic substrate. Once electrostatic force is no longer applied between the substrate and moveable electrodes, the distal and medial portions of the moveable composite reassume the separated position due to the bias inherent in the flexible composite. As the distal portion curls, the substrate contact(s) and composite contact(s) are disconnected. The MEMS electrostatic switch and relay according to the present invention can switch voltages from 0.1 to 400 volts, while operating with electrostatic voltages in the range of 30 to 80 volts. Depending on the amount of electrical current switched and the device geometry, other switching voltages and operating voltages can be provided.

The present invention provides a method of using a MEMS device having a microelectronic substrate, a substrate electrode, a substrate contact, and a moveable composite. The moveable composite includes an electrode layer and a moveable composite. The moveable composite is moveable in response to an electrostatic force created between the substrate electrode and the electrode layer of the moveable composite. The method for using the MEMS device comprises the step of electrically isolating at least one of the substrate contact or the composite contact from the substrate electrode or composite electrode respectively. The method further comprises the step of selectively generating an electrostatic force between the substrate electrode and the electrode layer of the moveable composite. Further, the method comprises the step of moving the moveable composite toward the microelectronic substrate. The method comprises the step of electrically connecting the substrate contact and composite contact in a circuit electrically isolated from at least one of the substrate electrode or composite electrode. Optionally, the method comprises the step of electrically disconnecting the substrate contact and composite contact.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limiting the scope of the present invention in any way.

That which is claimed:

1. A MEMS device driven by electrostatic forces, comprising:

a microelectronic substrate supporting the MEMS device and defining a planar surface;

a substrate electrode forming a layer on the surface of said substrate;

a substrate contact attached to said substrate;

a moveable composite overlying said substrate electrode and having an electrode layer and a biasing layer, said moveable composite having a fixed portion attached to the underlying substrate, and a distal portion movable with respect to said substrate electrode;

a composite contact attached to said moveable composite; and an insulator electrically separating said substrate electrode from said moveable electrode, whereby said composite contact and said substrate contact are electrically connected when said moveable composite distal portion is attracted to said substrate.

2. A MEMS device according to claim 1, wherein said distal portion of said moveable composite is positionally biased with respect to said microelectronic substrate.

3. A MEMS device according to claim 1 wherein said moveable composite substantially conforms to the surface of said microelectronic substrate when said moveable composite distal portion is attracted to said substrate.

4. A MEMS device according to claim 1 wherein the electrode layer and the biasing layer of said moveable composite are formed from one or more generally flexible materials.

5. A MEMS device according to claim 1 wherein said substrate contact is generally flush with the upper surface of said substrate.

6. A MEMS device according to claim 1 wherein said substrate contact protrudes from the upper surface of said substrate.

7. A MEMS device according to claim 1 wherein said substrate contact has at least one generally smooth surface.

8. A MEMS device according to claim 1 wherein said substrate contact has at least one generally rough surface.

9. A MEMS device according to claim 1 wherein said substrate contact comprises a plurality of contacts.

10. A MEMS device according to claim 9 wherein at least two of said plurality of contacts are connected in series.

11. A MEMS device according to claim 9 wherein at least two of said plurality of contacts are connected in parallel.

12. A MEMS device according to claim 9 wherein said moveable composite forms a trough, and wherein at least two of said plurality of contacts are disposed perpendicular to the trough.

13. A MEMS device according to claim 1 wherein said substrate contact is electrically isolated from said substrate electrode.

14. A MEMS device according to claim 1, wherein said substrate electrode underlies substantially the entire area of the distal portion of said moveable composite.

15. A MEMS device according to claim 1, wherein said insulator is attached to and overlies said substrate electrode.

16. A MEMS device according to claim 1, further comprising an insulator between said substrate contact and said substrate electrode.

17. A MEMS device according to claim 1, wherein said composite biasing layer comprises at least one polymer film.

18. A MEMS device according to claim 1, wherein said composite biasing layer comprises polymer films on opposite sides of said composite electrode layer.

19. A MEMS device according to claim 1 wherein said composite biasing layer and electrode layer have different thermal coefficients of expansion, urging said moveable composite to curl.

20. A MEMS device according to claim 1 wherein said composite biasing layer comprises at least two polymer films of different thicknesses, urging said moveable composite to curl.

21. A MEMS device according to claim 1 wherein said composite biasing layer comprises at least two polymer films of different coefficients of expansion, urging said moveable composite to curl.

22. A MEMS device according to claim 1, wherein the distal portion of said moveable composite curls out of the plane defined by the upper surface of said moveable composite when no electrostatic force is created between said composite electrode and said moveable electrode.

23. A MEMS device according to claim 22 wherein said moveable composite has different radii of curvature at different locations along the distal portion.

24. A MEMS device according to claim 1, wherein said composite contact is electrically isolated from said composite electrode.

25. A MEMS device according to claim 1, wherein said composite contact is generally flush with the lower surface of said moveable composite.

26. A MEMS device according to claim 1, wherein said composite contact protrudes from the lower surface of said moveable composite.

27. A MEMS device according to claim 1 wherein said composite contact has at least one generally smooth surface.

28. A MEMS device according to claim 1 wherein said composite contact has at least one generally rough surface.

29. A MEMS device according to claim 1, wherein said composite contact comprises a plurality of contacts.

30. A MEMS device according to claim 29 wherein at least two of said plurality of contacts are connected in series.

31. A MEMS device according to claim 29 wherein at least two of said plurality of contacts are connected in parallel.

32. A MEMS device according to claim 29, wherein at least one of said composite contacts is electrically isolated from said composite electrode.

33. A MEMS device according to claim 1, wherein the surface area of said substrate electrode comprises generally the same surface area as said moveable electrode.

34. A MEMS device according to claim 1, wherein said substrate electrode generally encompasses said substrate contact.

35. A MEMS device according to claim 1, wherein said composite electrode layer generally encompasses said composite contact.

36. A MEMS device according to claim 1, wherein the shape of said substrate electrode is generally the same as the shape of said moveable electrode.

37. A MEMS device according to claim 1, wherein said moveable composite has a generally rectangular shape.

38. A MEMS device according to claim 1, further comprising a source of electrical energy electrically connected to at least one of said substrate contact and said composite contact.

39. A MEMS device according to claim 38, further comprising at least one device electrically connected to at least one of said substrate contact and said composite contact.

40. A MEMS device according to claim 1, further comprising a source of electrical energy electrically connected to at least one of said substrate electrode and said composite electrode.

41. A MEMS device according to claim 40, further comprising a switching device electrically connected to at least one of said substrate electrode and said composite electrode.

42. A method of using a MEMS device solely supported by a microelectronic substrate having a substrate electrode and a substrate contact, and a moveable composite having an electrode layer and a composite contact, said moveable composite movable in response to an electrostatic force created between the substrate electrode and the electrode layer, the method comprising the steps of:

electrically isolating at least one of the substrate contact or the composite contact from its respective associated substrate electrode or composite electrode, selectively generating an electrostatic force between the substrate electrode and the electrode layer of said moveable composite;

moving said moveable composite toward the substrate; and electrically connecting the substrate contact and composite contact in a circuit electrically isolated from at least one of the substrate electrode or composite electrode.

* * * * *